United States Patent
Schoeller et al.

(10) Patent No.: US 6,507,153 B2
(45) Date of Patent: Jan. 14, 2003

(54) GAS DISCHARGE LAMP WITH ELLIPSOIDAL DISCHARGE CHAMBER

(75) Inventors: Klaus Schoeller, Nidegen (DE); Helmut Tiesler-Wittig, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/947,778

(22) Filed: Sep. 7, 2001

(65) Prior Publication Data

US 2002/0067141 A1 Jun. 6, 2002

(30) Foreign Application Priority Data

Sep. 8, 2000 (DE) .......................................... 100 44 683

(51) Int. Cl.[7] .................................................. H01J 13/46
(52) U.S. Cl. ........................ 315/56; 315/82; 315/39.53; 313/571; 313/620; 313/631
(58) Field of Search .............................. 315/77, 78, 82, 315/56, 59, 39, 39.53, 248; 313/571, 576, 620, 110, 113, 116, 631; 362/227, 255, 263, 511, 516, 519

(56) References Cited

U.S. PATENT DOCUMENTS

| | | | | |
|---|---|---|---|---|
| 4,958,263 A | * | 9/1990 | Davenport et al. | 362/255 |
| 4,968,916 A | * | 11/1990 | Davenport et al. | 313/113 |
| 5,016,152 A | * | 5/1991 | Awai et al. | 362/264 |
| 5,187,412 A | * | 2/1993 | El-Hamamsy et al. | 315/248 |
| 5,239,230 A | * | 8/1993 | Mathews et al. | 313/571 |
| 5,961,208 A | * | 10/1999 | Karpen | 313/112 |
| 6,128,431 A | * | 10/2000 | Siminovitch | 362/511 |
| 6,244,734 B1 | * | 6/2001 | Hulse | 362/495 |

FOREIGN PATENT DOCUMENTS

EP      0562872 B1     9/1993

* cited by examiner

Primary Examiner—Haissa Philogene
(74) Attorney, Agent, or Firm—Frank Keegan

(57) ABSTRACT

The invention relates to a gas discharge lamp, in particular a high-pressure discharge lamp for use in automobiles. The invention further relates to a lighting system with at least one light source, at least one light coupling system, at least one optical waveguide, and at least one light delivery system. Such lighting systems with a central light source and a distribution of the light over optical waveguides (i.e. suitable optical fiber systems) in remote locations are particularly suitable for applications in the automobile branch. For this application, a high brightness must be available already after a short run-up time of the lamp. To provide a gas discharge lamp with a high brightness, which makes available a sufficient brightness after a short period, a gas discharge lamp is proposed with a bulb which has an ellipsoidal discharge chamber in a central location, which chamber has a surface area with a maximum value of below 2.5 cm$^2$, with two electrodes projecting into the discharge chamber which have an electrode interspacing Ea of 1.5 mm to 3.0 mm inside the discharge chamber, with a filling in the discharge chamber which is in a gas discharge state during operation of the lamp and has a filling density of 80 to 90 mg/cm$^3$, with at least a mercury component in the filling which defines the filling density, and with an operating voltage between the electrodes in the discharge chamber of 80 to 90 V during lamp operation.

9 Claims, 2 Drawing Sheets

GAS DISCHARGE LAMP WITH ELLIPSOIDAL DISCHARGE CHAMBER

BACKGROUND OF THE INVENTION

The invention relates to a gas discharge lamp, in particular a high-pressure discharge lamp for use in automobiles. The invention further relates to a lighting system with at least one light source, at least one light coupling system, at least one optical waveguide, and at least one light delivery system.

Such lighting systems with a central light source and a distribution of the light over optical waveguides (i.e. suitable optical fiber systems) in remote locations are particularly suitable for applications in the automobile branch. In addition, light may also be generated in badly accessible locations or locations where a direct light generation is not possible or is possible with difficulty only (for example in a container with an explosive filling) for other reasons. The central light source must have properties here which are not achieved by known lamps. Among these are, for example, the run-up behavior upon switching-on, the effective brightness of the lamp, and the arc stability of the gas discharge. Furthermore, such a system (Remote Lighting System, RLS) renders possible a flexible distribution via optical waveguides and a saving in light sources, so that space is saved and sources of defects are avoided. Added to this is a wide freedom in the construction of the lighting device in the region where the light is emitted (light delivery system such as, for example, an automobile headlight projector). A central light source may be accommodated in an easily accessible and protected location in the automobile, and the light thereof is then transported to the front reflectors via optical waveguides which are not prone to defects. The freedom of design created thereby for the headlamp is required in particular in the field of automobiles.

Gas discharge lamps of the kind described above are known from European patent EP 0 562 872. A discharge lamp light source is disclosed therein which combines a high brightness with a sufficient convection stability of the arc of the gas discharge. The brightness of the lamp, or more exactly its luminescence, is advantageously indicated as the effective luminescence expressed as the arc luminescence per arc length squared ($lm/cm^2$). The arc discharge light source comprises a discharge tube with a discharge chamber formed therein and comprising a gas filling, which filling can be brought into a state of discharge through the supply of energy. At least two electrodes project into the discharge chamber and define an arc length of between 2 and 3.5 mm. The quantity of mercury present in the discharge chamber and various dimensions of the discharge tube are chosen such that a compromise is reached between the three mutually dependent quantities: the operating voltage, which determines the lamp efficacy, the convection stability, and the structural integrity of the discharge lamp. A region is indicated for a filling density value at which a sufficient structural integrity of the discharge tube is also safeguarded. To achieve that the discharge tube remains undamaged during lamp operation, the tensile stress of the discharge tube must lie below a maximum value, which is given by the material properties and the dimensions of the discharge tube. A compromise between the arc length, discharge chamber diameter, wall thickness, and mercury density in the lamp renders it possible to achieve a lamp which generates a quantity of light of the order of 50,000 $lm/cm^2$.

Known gas discharge lamps, such as disclosed inter alia in EP 0 562 872, have the disadvantage that a high brightness is available only after a run-up time of the lamp. This is an unacceptable drawback in particular for applications in automobiles because this time lies, for example, outside the legal requirements for a motorcar headlamp. It is a requirement for the run-up behavior of a headlamp that a given quantity of light should be generated within a given period of time after switching-on.

SUMMARY OF THE INVENTION

It is an object of the invention, therefore, to provide a gas discharge lamp of high brightness which supplies a sufficient brightness after a short time, so that in particular requirements relating to automobile headlamps are fulfilled.

This object is achieved by means of a gas discharge lamp having a bulb which has an ellipsoidal discharge chamber in a central location, which chamber has a surface area with a maximum value of less then 2.5 $cm^2$, with two electrodes extending into the discharge chamber and having an electrode distance $E_a$ inside the discharge chamber of 1.5 mm to 3.0 mm, with a filling in the discharge chamber which during lamp operation is in a gas discharge state and has a filling density of 80 to 90 $mg/cm^3$, with at least a mercury component in the filling which determines said filling density, and with an operating voltage between the electrodes in the discharge chamber of 80 to 90 V during lamp operation. A gas discharge lamp having the properties of claim 1 eliminates the disadvantages known from the prior art and in particular supplies a greater quantity of light within a shorter time after switching-on. It is this which renders the lamp suitable also for realizing the function of a headlamp in addition to other lighting devices in an automobile. Next to other statutory requirements for lighting devices in automobiles such as, for example, a given quantity of light, brightness, color temperature, and operational life for headlamps, a certain ignition and run-up behavior of the headlamp is also obligatory. After switching-on, at least 80% of the light must be available after 4 s. This property is achieved only with the gas discharge lamp according to the invention. The small discharge chamber in combination with the filling density and with the operating voltage renders possible an efficient gas discharge with a large quantity of light. A very high luminous flux per arc length squared of approximately 90,000 $lm/cm^2$ is achieved. In addition, at least 80% of the light is available already after 4 s. Such a gas discharge lamp is accordingly highly suitable as a light source for a system with a central light source and a distribution through optical waveguides in the automobile. Obviously, it is also possible to realize further lighting functions in addition to the headlamp function.

Additional optical waveguides may be used, for example, for making possible an interior or display lighting. Coupling of the light takes place at the central light source location, and the type and shape of the delivery from the optical waveguide in remote locations may be adapted to the respective requirements in situ.

In a further embodiment of the gas discharge lamp, the discharge chamber has an internal diameter of less than 4 mm measured in transverse direction of the bulb. It was found that the lamp has particularly good properties when the internal diameter of the discharge chamber lies in a region of between 3 and 4 mm, in particular at 3.7 mm.

In an advantageous further embodiment, the discharge chamber has a wall load factor on the surface of the discharge chamber of at least 25 $W/cm^2$. The wall load factor is a measure for the power of the gas discharge lamp per unit surface area of the discharge chamber. The wall load factor is accordingly a parameter for the load on the material of the discharge chamber, and thus for the operational life of the lamp. The value of the wall load factor increased in comparison with the prior art is made possible by the smaller discharge chamber. As a result, substantially more light is generated in the small volume of the discharge chamber.

An embodiment of the invention relates in particular to suitable dimensions of the discharge chamber, which has preferably a width of less than 8 mm and a length of less than 8 mm. The discharge chamber thus is substantially smaller than that of known lamps. It is advantageous to give the discharge chamber a width lying in the range from 6 to 7.7 mm, in particular 7.6 mm, which is combined with a length lying in the range from 6 to 8 mm, in particular at 7.4 mm.

In a preferred further embodiment of the lamp according to the invention, the filling of the discharge chamber comprises at least mercury and a rare gas, preferably xenon. In a manner which is known per se, an improved ignition behavior of the filling gas is achieved by means of a filling of mercury and rare gas also in a lamp according to the invention. Advantageously, the filling of the discharge chamber in addition comprises a component of at least one metal halide, by means of which in particular the color temperature of the light for a headlamp of an automobile can be adjusted.

In a further embodiment of the invention, the lamp is operated at 50 to 70 W. Operation of the lamp with a power in this range offers the advantage that existing electronic ballasts can be used. A value of 90 to 100 lm/W can be achieved for the luminous efficacy of the gas discharge lamp according to the invention.

In a further embodiment, the lamp has a value for the Grashof number Gr divided by a proportionality constant C of less than 500 mg$^2$/cm$^3$. As is known from the prior art, the Grashof number Gr is a parameter for the convection stability. It depends on the internal diameter of the discharge chamber and on the filling density of the components of the filling in the discharge chamber. A proportionality factor C is introduced for determining the value. The smaller the value for Gr/C, the more stable the gas discharge lamp with respect to convection in the discharge chamber. Such a lamp with a value of less than 500 mg$^2$/cm$^3$ for Gr/C is accordingly particularly stable against convection. This may be achieved in particular by means of a small internal diameter.

Furthermore, the object is achieved by means of a lighting system comprising such a gas discharge lamp as its light source.

BRIEF DESCRIPTION OF THE DRAWINGS

The invention will now be explained in more detail below with reference to an embodiment in the drawing.

DETAILED DESCRIPTION OF THE PREFERRED EMBODIMENTS

Figure 1:
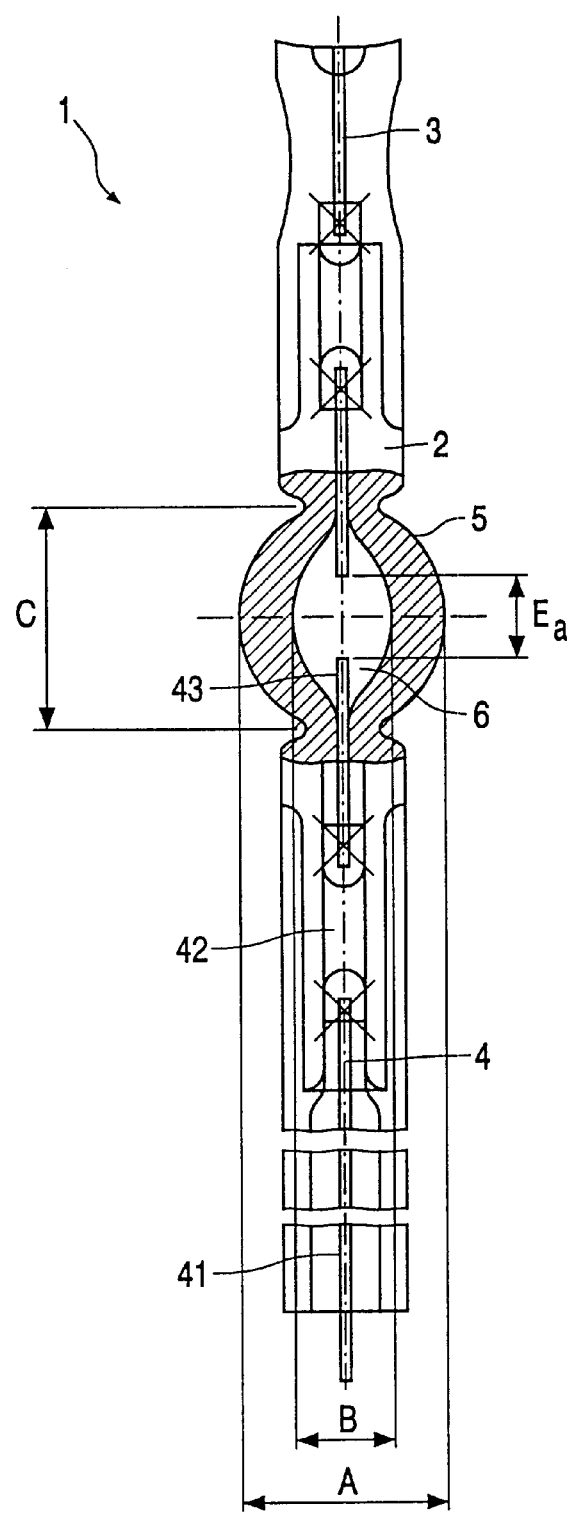
FIG. 1 shows a gas discharge lamp according to the invention.

FIG. 1 shows a gas discharge lamp 1 which comprises a tubular bulb 2 of quartz glass and two mutually opposed electrodes 3 and 4. The bulb 2 has a length in the range from 50 to 110 mm. A discharge chamber 5 is positioned approximately in the center of the bulb 2. The discharge chamber 5 is closed off in a vacuumtight manner by means of two pinches in the bulb 2.

The electrode 4 is composed of an outer electrode 41 for external contacting, a molybdenum foil 42, and an internal electrode 43. The second electrode 3 is of a similar construction. The molybdenum foil 42 connects the outer electrode 41 to the internal electrode 43 in the region of a pinch of the bulb 2. The internal electrode 43 extends into the discharge chamber 5 where it has an electrode distance $E_a$ of 2.3 mm to the other internal electrode. The invention, however, is not limited to the embodiment shown with a bulb 2 pinched at two sides, but it may equally well apply to a bulb pinched at one side only.

The discharge chamber 5, which encloses a discharge space 6 with a diameter referenced B of 3.7 mm, has a width referenced A of 7.6 mm and a length referenced C of 7.4 mm. This leads to a comparatively small discharge space 6 with a surface area of approximately 2.0 cm$^2$. In the discharge space 6 there is a filling which is composed of mercury, xenon, and metal halide. In the operational condition of the lamp 1, the voltage applied to the outer electrodes leads to an operating voltage between the internal electrodes of approximately 85 V. The filling is in a gaseous discharge state owing to the excitation and generates approximately 4800 lm for a power of 50 W.

Figure 2:
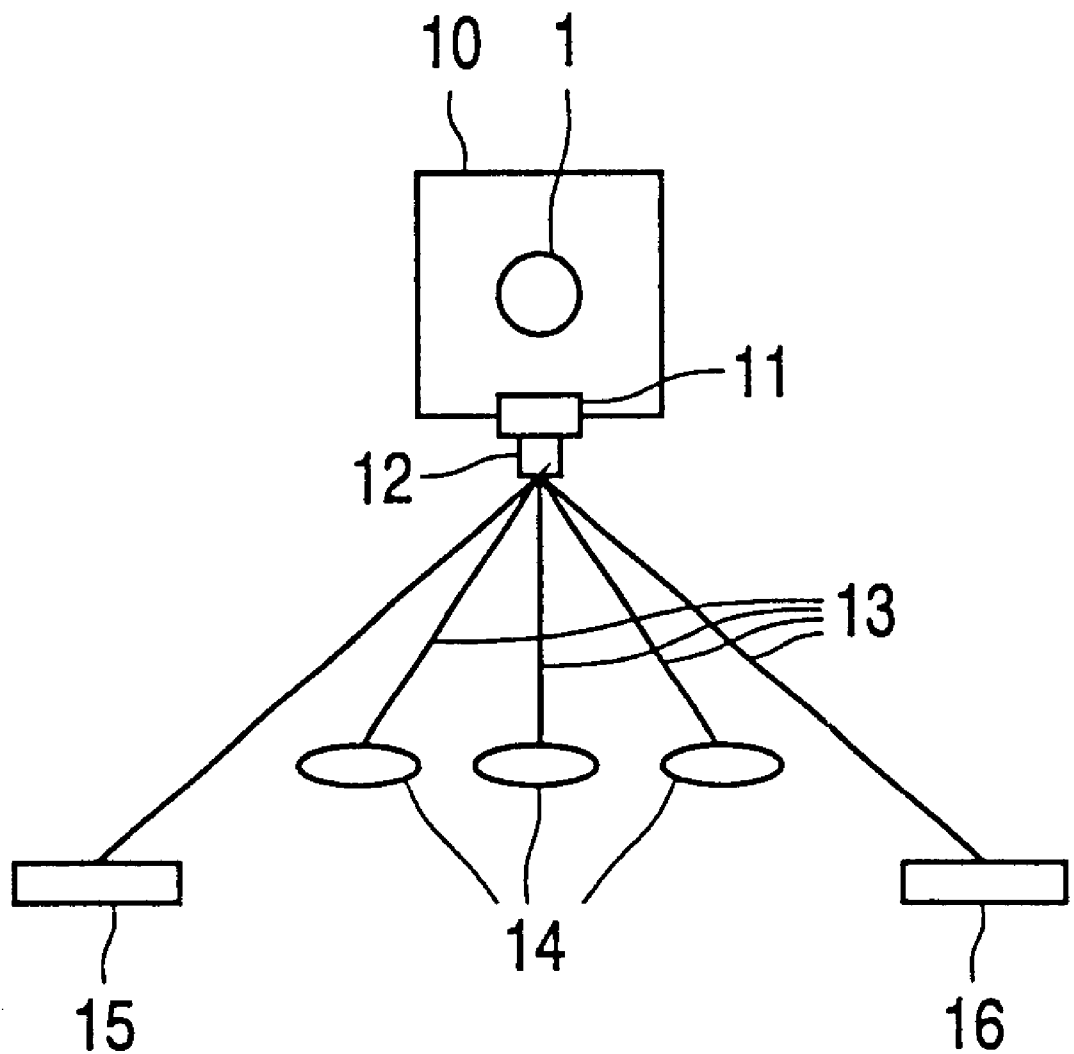
FIG. 2 shows a lighting system with a gas discharge lamp.

FIG. 2 shows a lighting system with a gas discharge lamp 1 as the central light source, arranged in a light coupling system 10. The known system 10 is described briefly only. It comprises a housing with a reflector or a similar optical unit in which the lamp 1 is exchangeably arranged. The reflector focuses the light generated by the lamp 1 onto an input opening 11. The light coupling system 10 may also be provided with a fan or some other device suitable for heat regulation. In the embodiment, furthermore, a light mixer 12 is provided in front of the inlet opening 11, consisting of a 30–60 mm long quartz glass rod. The light mixer 12 achieves a homogeneous light distribution at its end, so that the proportional output light quantity of any optical waveguide 13 connected to the light mixer is given by the diameter and the length of the relevant optical waveguide 13. If no light mixer 12 is provided, for saving space and to avoid any light losses, the light generated by the input coupling system 10 is distributed over the individual optical waveguides 13 in the manner in which it issues at the coupling opening 1.

Several optical waveguides 13 are connected to the light mixer 12, which optical waveguides are connected to light delivery systems 14, 15, 16. Besides two headlamps 15 and 16, several further lighting devices 14 of the automobile, for example interior lights, rear lights, and other signaling lights, may be connected. The number and nature of the lighting devices depend on the generated quantity of light of the coupling system 10 used, i.e. on the lamp 1, the efficiency of the reflector, and the diameter of the coupling opening 11, and on the efficiency of the optical waveguides 13, i.e. in particular on the material quality, the diameter, and the length thereof. The lighting system may be optimized through an improvement in the reflector properties and by means of a large coupling opening 11. In addition, the installation of more than one such system in a motor vehicle is conceivable. The properties of the light at a lighting device 14 may be adapted to the respective lighting device by means of suitable optical waveguides (reduction of luminous intensity through attenuation or absorption) or color discs (adjustment of a given color).

What is claimed is:

1. A gas discharge lamp (1)
   with a bulb (2) which comprises an ellipsoidal discharge chamber (5) in a central position, which chamber has a surface area with a maximum value of less than 2.5 cm$^2$, with two electrodes (3, 4) extending into the discharge chamber (5) and having an electrode interspacing $E_a$ of 1.5 mm to 3.0 mm inside the discharge chamber (5), with a filling in the discharge chamber (5) which is in a gas discharge state during operation of the lamp (1) and which has a filling density of 80 to 90 mg/cm$^3$, with at least a mercury component in the filling which determines the filling density, and with an operating voltage between the electrodes (3, 4) in the discharge chamber (5) of 80 to 90 V during operation of the lamp (1).

2. A gas discharge lamp (1) as claimed in claim 1, characterized in that the discharge chamber (5) has an internal diameter (B) of less than 4 mm measured in transverse direction across the bulb (2).

3. A gas discharge lamp (1) as claimed in claim 1, characterized in that the discharge chamber (5) has a wall load factor on its surface of at least 25 W/cm$^2$.

4. A gas discharge lamp (1) as claimed in claim 1, characterized in that the discharge chamber (5) has a width (A) of less than 8 mm and a length (C) of less than 8 mm.

5. A gas discharge lamp (1) as claimed in claim 1, characterized in that the filling of the discharge chamber (5) comprises at least mercury and a rare gas, preferably xenon.

6. A gas discharge lamp (1) as claimed in claim 1, characterized in that the filling of the discharge chamber (5) comprises at least mercury, a rare gas, preferably xenon, and a metal halide.

7. A gas discharge lamp (1) as claimed in claim 1, characterized in that the lamp (1) is operated at 50 to 70 W.

8. A gas discharge lamp (1) as claimed in claim 1, characterized in that the lamp (1) has a value for the Grashof number Gr divided by a proportionality constant C of less than 500 mg$^2$/cm$^3$.

9. A lighting system, in particular for motor vehicles, with at least one light source (1), at least one light coupling system (10), at least one optical waveguide (13), and at least one light delivery system (14, 15, 16), wherein the light source (1) is a gas discharge lamp with a bulb (2) which comprises an ellipsoidal discharge chamber (5) in a central position, which chamber has a surface area with a maximum value of less than 2.5 cm$^2$, with two electrodes (3, 4) extending into the discharge chamber (5) and having an electrode interspacing $E_a$ of 1.5 mm to 3.0 mm inside the discharge chamber (5), with a filling in the discharge chamber (5) which is in a gas discharge state during operation of the lamp (1) and which has a filling density of 80 to 90 mg/cm$^3$, with at least a mercury component in the filling which determines the filling density, and with an operating voltage between the electrodes (3, 4) in the discharge chamber (5) of 80 to 90 V during operation of the lamp (1).

* * * * *